(12) United States Patent
Choy et al.

(10) Patent No.: US 12,157,142 B2
(45) Date of Patent: Dec. 3, 2024

(54) INTEGRATION OF METAL NANOWIRE NETWORK INTO CONDUCTING POLYMERS

(71) Applicant: THE UNIVERSITY OF HONG KONG, Hong Kong (CN)

(72) Inventors: Chik Ho Choy, Hong Kong (CN); Jinwook Kim, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 298 days.

(21) Appl. No.: 17/754,993

(22) PCT Filed: Oct. 16, 2020

(86) PCT No.: PCT/CN2020/121538
§ 371 (c)(1),
(2) Date: Apr. 18, 2022

(87) PCT Pub. No.: WO2021/073608
PCT Pub. Date: Apr. 22, 2021

(65) Prior Publication Data
US 2022/0388029 A1 Dec. 8, 2022

Related U.S. Application Data

(60) Provisional application No. 62/916,193, filed on Oct. 16, 2019.

(51) Int. Cl.
*B05D 1/38* (2006.01)
*B05D 1/00* (2006.01)
(Continued)

(52) U.S. Cl.
CPC ............... *B05D 1/38* (2013.01); *B05D 1/005* (2013.01); *B05D 1/02* (2013.01); *B05D 1/28* (2013.01);
(Continued)

(58) Field of Classification Search
None
See application file for complete search history.

(56) References Cited

U.S. PATENT DOCUMENTS

2014/0238833 A1* 8/2014 Virkar ..................... B32B 15/18
428/605
2014/0287639 A1 9/2014 Lee et al.
(Continued)

FOREIGN PATENT DOCUMENTS

CN 103109391 A 5/2013
CN 103440896 A 12/2013
(Continued)

OTHER PUBLICATIONS

Chavez—palladium functionalized nanowires by drop casting method—2013 (Year: 2013).*
(Continued)

*Primary Examiner* — John Vincent Lawler
(74) *Attorney, Agent, or Firm* — Saliwanchik, Lloyd & Eisenschenk

(57) ABSTRACT

A metallic nanowire:conductive polymer composite is fabricated. A metallic nanowire layer is formed by a process that leaves an organic ligand residue on the metallic nanowire layer. A conductive polymer film is formed on a supporting substrate. The metallic nanowire layer is integrated with the conductive polymer film to form a metallic nanowire:conductive polymer composite. The metallic nanowire:conductive polymer composite is wet by a reaction solution including a source of metal ions, at least one acid, and a solvent for a period of time sufficient to remove the organic ligand residues from the metallic nanowire layer and sufficient to grow metal nanoparticles from the source of metal ions to create metal interconnections at junctions where the two or more nanowires in the metallic nanowire layer touch each other. Following growth of the nanoparticles, the
(Continued)

nanowire:conductive polymer composite is removed from the reaction solution and dried.

23 Claims, 3 Drawing Sheets

(51) Int. Cl.
*B05D 1/02* (2006.01)
*B05D 1/28* (2006.01)
*B82Y 30/00* (2011.01)
*B82Y 40/00* (2011.01)

(52) U.S. Cl.
CPC ...... *B05D 2201/02* (2013.01); *B05D 2420/01* (2013.01); *B05D 2420/02* (2013.01); *B82Y 30/00* (2013.01); *B82Y 40/00* (2013.01)

(56) References Cited

U.S. PATENT DOCUMENTS

| | | | |
|---|---|---|---|
| 2016/0038909 A1* | 2/2016 | Choy | H01B 13/30 204/157.4 |
| 2018/0062044 A1* | 3/2018 | Kim | H01L 31/022425 |

FOREIGN PATENT DOCUMENTS

| | | | | |
|---|---|---|---|---|
| CN | 105568270 A | * | 5/2016 | B82Y 40/00 |
| CN | 106782769 A | | 5/2017 | |
| CN | 107118563 A | | 9/2017 | |
| CN | 108598288 A | | 9/2018 | |
| CN | 108615582 A | * | 10/2018 | G06F 3/041 |
| WO | WO 2014/127909 A | * | 8/2014 | H01B 1/00 |

OTHER PUBLICATIONS

Lu—IDS—Locally Welded Silver Nano-Network Transparent Electrodes—Adv.Func.Mat. 2015 (Year: 2015).*
Kim—IDS—Inverted Layer-By-Layer Fabrication of Ag Nanowire—spin coating+motive—Adv. Func. Mat.—2015 (Year: 2015).*
Lyu—CN 105568270 A—IDS—MT—silver nanowire in welding fluid—2016 (Year: 2016).*
Xu—CN 108615582 A—PCT D1—MT—conductive layer w-nanowires—2018 (Year: 2018).*
Zhang—removal of PVP ligands on nanowires—Spectrochimica Acta Part A—online Nov. 2019—pub 2020 (Year: 2019).*
Ossila—PEDOT_PSS and PEDOT Based Polymer Materials—Apr. 4, 2024 (Year: 2024).*
Office Action dated Aug. 16, 2023 in Chinese Application No. 202080071874.X.
International Search Report dated Jan. 15, 2021 in International Application No. PCT/CN2020/121538.
Hu, L., et al., "Scalable Coating and Properties of Transparent, Flexible, Silver Nanowire Electrodes," ACS Nano, 2010, 4(5):2955-2963.
Lu, H., et al., "Selective Growth and Integration of Silver Nanoparticles on Silver Nanowires at Room Conditions for Transparent Nano-Network Electrode," ACS Nano, 2014, 8(10):10980-10987.
Zilberberg, K., et al., "Highly Robust Indium-Free Transparent Conductive Electrodes Based on Composites of Silver Nanowires and Conductive Metal Oxides," Adv. Funct. Mater., 2014, 24:1671-1678.
Kim. A., et al., "All-Solution-Processed Indium-Free Transparent Composite Electrodes based on Ag Nanowire and Metal Oxide for Thin-Film Solar Cells," Adv. Funct. Mater., 2014, 24:2462-2471.
Lu, H., et al., "Locally Welded Silver Nano-Network Transparent Electrodes with High Operational Stability by a Simple Alcohol-Based Chemical Approach," Adv. Funct. Mater., 2015, 25:4211-4218.
Kim, Y., et al., "Inverted Layer-By-Layer Fabrication of an Ultraflexible and Transparent Ag Nanowire/Conductive Polymer Composite Electrode for Use in High-Performance Organic Solar Cells," Adv. Funct. Mater., 2015, 25:4580-4589.
Kang, M.-G., et al., "Organic Solar Cells Using Nanoimprinted Transparent Metal Electrodes," Adv. Mater., 2008, 20:4408-4413.
Gaynor, W., et al., "Color in the Corners: ITO-Free White OLEDs with Angular Color Stability," Adv. Mater., 2013, 25:4006-4013.
Seo, J.H., et al., "Cold Isostatic-Pressured Silver Nanowire Electrodes for Flexible Organic Solar Cells via Room-Temperature Processes," Adv. Mater., 2017, 29:1-8.
Lin, P., et al., "Semitransparent organic solar cells with hybrid monolayer graphene/metal grid as top electrodes," Applied Physics Letters, 2013, 102:1-4.
Ge, Y., et al., "Direct Room Temperature Welding and Chemical Protection of Silver Nanowire Thin Films for High Performance Transparent Conductors," J. Am. Chem. Soc. 2018, 140:193-199.
Yuan, M., et al., "A Method for Removing Self-Assembled Monolayers on Gold," Langmuir, 2008, 24(16):8707-8710.
Basarir, F., et al., "Recent progresses on solution-processed silver nanowire based transparent conducting electrodes for organic solar cells," Materials Today Chemistry, 2017, 3:60-72.
Groep, J.V.D., et al., "Transparent Conducting Silver Nanowire Networks," Nano Letters, 2012, 12:3138-3144.
Ansar, S.M., et al., "Removal of Molecular Adsorbates on Gold Nanoparticles Using Sodium Borohydride in Water," Nano Letters, 2013, 13:1226-1229.
Ding, M., et al., "An on-chip electrical transport spectroscopy approach for in situ monitoring electrochemical interfaces," Nature Communications, 2015, 6:1-9.
Garnett, E.C., et al., "Self-limited plasmonic welding of silver nanowire junctions," Nature Materials, 2012, 11:241-249.
Cho, E.-H., et al,. "Low-visibility patterning of transparent conductive silver-nanowire films," Optics Express, 2015, 23(20):1-9.
Huang, Q., et al., "Highly flexible and transparent film heaters based on polymide films embedded with silver nanowires," RSC Adv., 2015, 5:45836-45842.
Li, L., et al., "A Solution Processed Flexible Nanocomposite Electrode with Efficient Light Extraction for Organic Light Emitting Diodes," Scientific Reports, 2014, 4:1-8.
Hwang, B., et al., "Highly Reliable Ag Nanowire Flexible Transparent Electrode with Mechanically Welded Junctions," Small, 2014, 10(16):3397-3404.

* cited by examiner

1

INTEGRATION OF METAL NANOWIRE NETWORK INTO CONDUCTING POLYMERS

CROSS-REFERENCE TO RELATED APPLICATIONS

This application is the U.S. national stage application of International Patent Application No. PCT/CN2020/121538, filed Oct. 16, 2020, which claims the benefit of U.S. Provisional Application No. 62/916,193, filed Oct. 16, 2019, the disclosures of each of which are incorporated herein by reference in their entirety.

FIELD OF THE INVENTION

The present invention relates to flexible transparent conductive electrodes composed of metallic nanowires and conducting polymers, and, more particularly, to methods for enhancing conductivity and durability of the composite electrodes.

BACKGROUND

Transparent conductive electrodes are needed in a wide variety of electrical devices, including displays, solar cells, and LEDs. Conventionally, indium tin oxide (ITO) is used as a transparent conductive electrode in these applications. However, the indium content of this material makes the cost of ITO high. Further, ITO is typically deposited by relatively expensive vapor deposition techniques and is a brittle material that can easily crack. Therefore, research has been devoted to finding replacement materials with suitable conductivity and transparence.

Metallic nanowire-based electrodes including gold, silver, copper, etc. have emerged as promising candidates for different applications such as heaters, smart windows, solar cells, light-emitting diodes due to the advantages of outstanding mechanical flexibility, high transparency and excellent electrical conductivity.

However, metal nanowires typically possess very rough surfaces, which limits their use as lower electrodes in devices. To solve the surface roughness issue, metal nanowires may be incorporated into a polymer substrate. Although the incorporation of nanowires into a polymer substrate matrix results in a smooth surface, only a very small portion of the nanowires in this composite structure can be exposed. This results in a limited pathway in charge carrier injection/extraction for device applications. Recently, this limited pathway was improved by incorporation of hybrid metallic nanowires into conducting polymers, which results in a smooth electrode surface with a large surface coverage of conducting pathways.[1]

Although nanowires are promising for electrode use, a large contact resistance due to poor connections among nanowires is a critical issue Improving connections by welding nanowires to each other within the nanowire network cannot be performed in the nanowire/polymer composite by high-energy treatments that use high temperature, high pressure or high light-intensity illumination as the welding methods.[2-4] In other words, such high energy treatments are restricted to metallic nanowire films but not to electrode structures that combine metallic nanowires and other conducting materials such as conducting polymers.

In addition to the need to improve nanowire connections, the methods used to form the nanowires themselves often leave behind one or more residues that limit conductivity. For example, capping ligands such as polyvinylpyrrolidone (PVP) may be attached to a metal wire surface. As an insulating material, PVP both limits the conductivity and inhibits the ability to form connections among nanowires. This problem is exacerbated when metal nanowires are incorporated into composite structures with adjacent conducting materials, such as conducting polymers. Consequently, the presence of residues is a challenge to achieve a highly durable and conductive electrode. Thus, there is a need in the art to improve the conductivity of metal-nanowire/conducting polymer composites. Such improved-conductivity composites could be used to replace indium tin oxide electrodes in a wide variety of electronic devices.

SUMMARY OF THE INVENTION

The present invention provides an improved metallic nanowire/conductive polymer composite and a method of making the metallic nanowire/conductive polymer composite. The method includes forming a metallic nanowire layer by a process that leaves organic ligand residues on the metallic nanowire layer. In addition, the metallic nanowire layer includes a plurality of junctions where two or more nanowires touch each other.

A conductive polymer film is formed on a supporting substrate. The metallic nanowire layer is integrated with the conductive polymer film to form a metallic nanowire:conductive polymer composite. The nanowire:conductive polymer composite is wet by a reaction solution including a source of metal ions, at least one acid, and a solvent for a period of time sufficient to remove the organic ligand residues from the metallic nanowire layer and sufficient to grow metal nanoparticles from the source of metal ions to create metal interconnections at the junctions where the two or more nanowires in the metallic nanowire layer touch each other.

Following growth of the nanoparticles, the nanowire:conductive polymer composite is removed from the reaction solution and dried.

DETAILED DESCRIPTION

Figure 2:
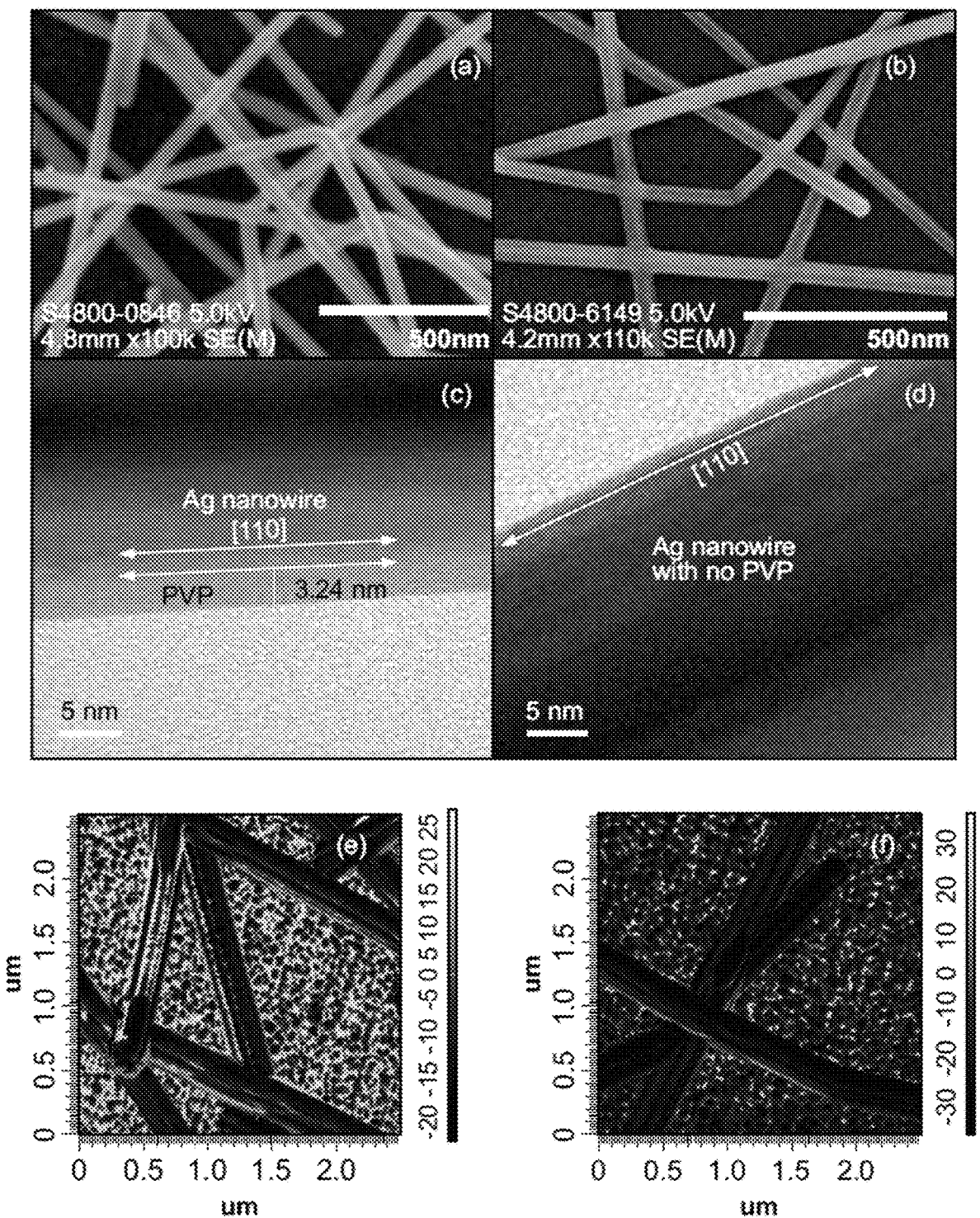
FIG. 2a is an SEM image of an integrated Ag nanowire with a conducting polymer film without chemical treatment of the present invention showing a lack of interconnections among the nanowires.
FIG. 2b is an SEM image of an integrated Ag nanowire with a conducting polymer film with the chemical treatment of the present invention showing increased interconnections among nanowires.
FIG. 2c is a TEM image of a Ag nanowire film without the chemical treatment of the present invention showing PVP residues on the nanowires; (about the PVP removal)
FIG. 2d is a TEM image of a Ag nanowire film with the chemical treatment of the present invention, showing that PVP residues have been removed.
FIG. 2e is an AFM image of a Ag nanowire structure with conducting polymer film without the chemical treatment of the present invention, showing the presence of PSS
FIG. 2f is an AFM image of a Ag nanowire with conducting polymer film with the chemical treatment of the present invention, showing about the PSS removal.

Turning to the drawings in detail, FIG. 2a depicts a photomicrograph of a conventional silver nanowire structure. Such a nanowire structure may be formed by a number of techniques. To regulate the growth of the nanowires, a surfactant may be added to the solution. The surfactant includes organic capping ligands that surround the wire during its formation to control the growth and also inhibit coalescence with adjacent nanowires or particles. An example of a capping ligand is polyvinyl pyrrolidone (PVP). The presence of a residue of PVP both decreases the conductivity of the nanowire structure, it also inhibits metal-to-metal contact between adjacently-contacting nanowires.

In one technique, polyol synthesis is employed for the preparation of metallic nanostructures with well-controlled shapes (e.g. nanoparticles, nanorods, nanowires, etc.) using the temperature-dependent reducing ability of polyols in presence of appropriate capping agents (described in J. Mater. Chem., 2008, 18, 437-441, Adv. Mater. 2011, 23, 3052-3056, the disclosure of which is incorporated by reference herein). During Ag nanowires preparation, polyvinyl pyrrolidone (PVP) plays an important role in stabilization of {100} facets of the multiply twinned Ag particle by chemisorption so that the growth only occurs at the edges of Ag nanowires with preferential growth in [110].

As seen in FIG. 2a, the nanowires overlap each other at various junctions, but are not interconnected at these points, limiting electrical conductivity in the nanowire network. As can be seen in FIG. 2a, the metallic nanowires create a rough three-dimensional structure due to the different wire orientations which makes it difficult to use in conventional electrodes.

Various metals may be used to form the metallic nanowire structure including, but not limited to, silver, gold, platinum, aluminum, or palladium. Any conductive metal that is susceptible of formation into a nanowire structure may be used in the composites of the present invention.

It is desirable to integrate the structure of FIG. 2a into a conductive polymer matrix. A composite metallic nanowire/conductive polymer composite exhibits improved conductivity over either material used alone which still maintaining sufficient transparency to be used as a transparent electrode. Various conductive polymers may be used as the polymer matrix. In exemplary embodiments, the conductive polymers are intrinsically conducting polymers that conduct electricity. These polymers include (poly(3,4-ethylenedioxythiophene) polystyrene sulfonate) (PEDOT:PSS), poly[2,6-(4,4-bis-potassiumbutanylsulfonate-4H-cyclopenta-[2,1-b;3,4-b']-dithiophene)-alt-4,7-(2,1,3-benzothiadiazole)] (CPE-K) or poly[2,6-(4,4-bis-sodiumbutanylsulfonate-4H-cyclopenta-[2,1-b;3,4-b']-dithiophene)-alt-4,7-(benzene)] (CPEPh-Na). However, other conductive polymers may be used that exhibit similar conductive properties and have sufficient mechanical integrity to function as an electrode at the operating temperatures of the electrical devices into which they are incorporated.

According to the present invention, a layer of conductive polymer may be formed on a substrate. The conductive polymer may be deposited by a number of known techniques used in polymer layer fabrication. For example, the polymer to be deposited may be formed in a solution and the solution may deposited by spin coating, drop casting, spray coating, Mayer rod techniques, or doctor blade techniques onto a substrate. Substrates may include any material that can support a thin film on its surface and permit removal of the formed polymer material. These materials include glass, polyethylene terephthalate (PET), polyethylene naphthalate (PEN) or polyimide (PI).

In order to incorporate a metallic nanowire structure into the layer of conductive polymer to create a nanowire:polymer composite, the metallic nanowires may be formed into a suspension in a suspending liquid. A layer of the metallic nanowires in the carrier liquid may be deposited on the layer of conductive polymer by spin coating, drop casting, spray coating, Mayer rod techniques, or doctor blade techniques. Other techniques may be used as long as they are capable of forming the metallic nanowires into a layer on the conductive polymer. The metallic nanowires are at least partially integrated into the conductive polymer layer such that the conductive polymer layer can interact with the metallic nanowires to facilitate conduction of electrons through the composite structure.

In order to enhance conductivity of the metallic nanowire:conductive polymer composite, it is desirable to remove the non-conductive capping ligands from the metallic nanowire structure. It is further desirable to form interconnecting junctions among the nanowires at points where adjacent wires contact each other. The present invention accomplishes both objectives in a single chemical treatment process through contact with a liquid that includes a source of metal ions, at least one acid, and a solvent. By contacting the capping ligand-coated nanowires with the treatment solution, the capping ligands are removed and metal particles are added to nanowire junctions to create metal junctions among the nanowires. This is depicted in FIG. 2b where the interconnections among nanowires compared to the untreated and unconnected nanowires of FIG. 2a may be clearly seen.

In one aspect the treatment solution may include a metal salt as a source of metal ions. Examples of metal salts suitable for use in the treatment solution include one or a combination of two or more of silver nitrate, silver acetate, Tollens' reagent, silver fluoride, chloroplatinic acid, sodium tetrachloropalladate, potassium tetrachloropalladate, palladium chloride, or gold chloride hydrate. The acid may be selected from acetic acid or ascorbic acid although other acids may be used. Various solvents may be used including water, ethanol, methanol, isopropanol, ethylene glycol, glycerin or mixtures thereof. Optionally, a reducing agent may be added to the treatment solution. The reducing agent may be sodium citrate, citrate acid, acetaldehyde, or glucose.

The composite is wet by the treatment solution. The wetting may be performed by drop casting, dipping, or immersing. The solution remains in contact with the metallic nanowires for a period of time sufficient to move the ligand residue and to permit the metallic ions to build up along the wire junctions. The treatment time is in the range of several minutes with the lengths of time being adjusted based on the concentration of the solution and the desired growth of metal on the metallic nanowires. The treated metallic nanowires includes selective growth of metal nanoparticles on at least 75% of the junctions of the metallic nanowire layer.

Treatment with the solution may also remove components of the conducting polymer and increase the conductivity of the conducting polymer. For example, when PEDOT:PSS is used as the conductive polymer, contact by the treatment solution selectively removes PSS from the polymer. Removal of PSS is associated with an increase in conductivity of the resultant material by as much as 50 percent. Treatment times may be on the order of several minutes. In one aspect, the treatment time is approximately 1-5 minutes.

Following treatment, the treatment solution is removed and the metallic nanowire:conducting polymer structure is dried, for example, by nitrogen spray or air drying.

The present invention is set forth in further detail in the Example below:

Example 1

Embodiments of the subject invention are drawn to the integrated ligand-free Ag nano-network and poly(3,4-ethylenedioxythiophene) (polystyrene sulfonate) (PEDOT:PSS) as the alternating conducting polymer. The integrated electrode were obtained by the inventive chemical approach, simultaneously welding the Ag nanowire cross-junctions while removing a polyvinyl pyrrolidone (PVP) capping ligand along the Ag nanowire surfaces; and eliminating acidic polystyrene sulfonate (PSS) from PEDOT:PSS to construct Ag nanowire protection from etching.

Figure 1:
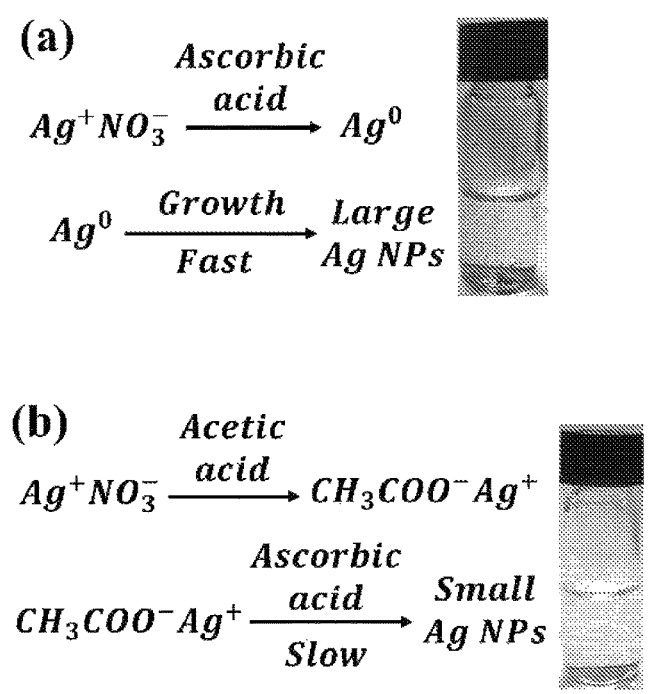
FIG. 1a details the chemical reaction in a chemical reagent mixture of silver nitrate and ascorbic acid.
FIG. 1b details the chemical reaction in a chemical reagent mixture of silver nitrate, ascorbic acid and acetic acid.

For the chemical reagent mixture solution, by strategically adding acetic acid (to get a steady-state 3-4 pH value) in the mixture solution of silver nitrate (0.1-1 mM) as a silver salt and ascorbic acid (10 mM) as a reducing agent, it is possible to control and form the ultra-fine Ag nanoparticle cluster assembled in the reagent mixture solution. As shown in FIG. 1a, a mixture of silver nitrate and ascorbic acid resulted in the rapid growth of silver particles; this growth was too fast once when the constituents were mixed together so that the large particles form. These large particles cannot effectively form connections at the cross-junctions of two nanowires, which only have a very narrow gap on the order of nanometers scale. Therefore, the approach shifted to the conditions depicted in FIG. 1B in which acetic acid, silver nitrate, ascorbic acid, and water were used. Using this treatment, the Ag nanoparticle clusters are well controlled as seen by the very clear solution containing ultra-fine Ag nanoparticle clusters formed at room temperature as shown in FIG. 1b.

In the chemical treatment process, wetting the integrated electrodes by the reagent mixture solution occurred for 1-3 min., followed by various methods such as spin-coating or blowing-off to remove the mixture solution from the surface while controlling reactive nano-droplets trapped on the nanoscale at the junction under the capillary force.

During the chemical reaction, an improved contact resistance of the hybrid film was achieved by the chemical treatment. FIG. 2b is a scanning electron microscope (SEM) photomicrograph and FIG. 2d is a transmission electron microscopy (TEM) image and FIG. 2f is an atomic force microscope (AFM) image; these images show the results of selectively welding at the cross junctions and removing the incoherently resistive PVP ligand, along with and removing acidic PSS from PEDOT:PSS respectively. These results are compared to the corresponding control samples without chemical treatment, shown in FIGS. 2a, c, and e, respectively.

Figure 3:
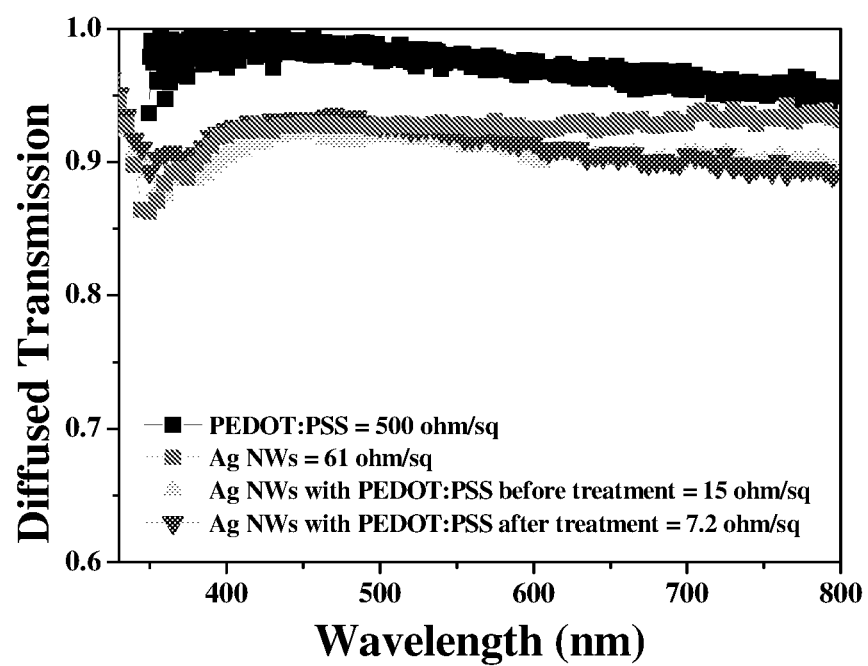
FIG. 3 depicts the measured optical (diffused) transmission properties of various electrodes and corresponding sheet resistance for materials prepared according to the present invention.

After the chemical treatment on the integrated electrodes, the measured optical (diffused) transmission properties of various optimized electrodes and corresponding sheet resistance is shown in FIG. 3. It is important to note that the newly proposed chemical Ag nanowire process is restriction-free to various electrodes covering from (but not limited to) bare Ag nanowire electrodes to composites of Ag nanowires with conducting polymers with different kinds of backbones such as ethylenedioxythiophene, cyclopentadithiophene, benzothiadiazole, etc. The PEDOT:PSS of this Example does not limit the types of materials that may be treated by the methods of the present invention.

Advantages:

In the present invention, highly durable and conductive electrodes of metallic nanowires and conductive polymers are formed. Advantages of the present invention include:

1. Simple chemical solution process: a simple alcohol-water based chemical treatment for the integrated metallic nanowires with conducting polymers, which is very low cost and involves abundant materials such as metal salts, reducing agents and acidic aqueous solutions.
2. Conductivity: large reduction of sheet resistance of the integrated electrodes by simultaneously achieving welding at the cross junction of the nanowires, and removing insulating capping ligands from the surface of the nanowires, and eliminating acidic components from conducting polymers.
3. Heavy duty: enhancing stability against continuous external electrical bias and numerous bending test on flexible substrate (e.g. polyethylene terephthalate (PET), colorless polyimide (cPI), etc.)
4. Restriction-released process to various electrodes: the chemical treatment is restriction-released for different kinds of electrodes including metallic nanowire films and their composite films of metallic nanowires with different kinds of conducting polymers.
5. Transparency: the optical property of the treated electrodes can be enhanced through removing the resistive capping ligands from metallic nanowire surfaces.
6. Green process: room temperature, room atmosphere and non-toxic process.
7. Favorable to large area processes: easy to achieve well-dispersed and well-wetted electrode films. After a certain reaction duration, simple blow the reacted chemical solution off the films by either spin-coater or nitrogen gun.
8. Low cost and low energy consumption: very simple equipment (blower: spin coater or nitrogen gun), typical materials (low concentration (— 10 mM) of metallic salts, reducing agents and acidic aqueous solutions).

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

REFERENCES

The following references are incorporated herein by reference in their entirety:

[1] Y. Kim, T. I. Ryu, K. H. Ok, M. G. Kwak, S. Park, N. G. Park, C. J. Han, B. S. Kim, M. J. Ko, H. J. Son, J. W. Kim, Adv. Funct. Mater. 2015, 25, 29.
[2] E. C. Garnett, W. S. Cai, J. J. Cha, F. Mahmood, S. T. Connor, M. G. Christoforo, Y. Cui, M. D. McGehee, M. L. Brongersma, Nat. Mater. 2012, 11, 241.
[3] T. C. Hauger, S. M. I. Al-Rafi a, J. M. Buriak, ACS Appl. Mater. Interfaces 2013, 5, 12663
[4] T. B. Song, Y. Chen, C. H. Chung, Y. Yang, B. Bob, H. S. Duan, G. Li, K. N. Tu, Y. Huang, Y. Yang, ACS Nano 2014, 8, 2804.

[5] Cheng Yang, Hongwei Gu, Wei Lin, Mathew M. Yuen, Ching Ping Wong, Mingyong Xiong, Bo Gao, Adv. Mater. 2011, 23, 3052-3056

[6] Kylee E. Korte, Sara E. Skrabalak, Younan Xia, J. Mater. Chem., 2008, 18, 437-441

The invention claimed is:

1. A method of integrating a ligand-free metallic nanowire network and conductive polymers, the method comprising:
forming a metallic nanowire layer by a process that leaves organic ligand residues on the metallic nanowire layer, the metallic nanowire layer including a plurality of junctions where two or more nanowires touch each other;
forming a conductive polymer film onto a supporting substrate;
integrating the metallic nanowire layer with the conductive polymer film to form a metallic nanowire:conductive polymer composite;
wetting the metallic nanowire:conductive polymer composite with a reaction solution including a source of metal ions and at least one acid for a period of time sufficient to remove the organic ligand residues from the metallic nanowire layer and sufficient to grow metal nanoparticles from the source of metal ions to create metal interconnections at the junctions where the two or more nanowires in the metallic nanowire layer touch each other;
removing the nanowire:conductive polymer composite from the reaction solution; and
drying the nanowire:conductive polymer composite;
wherein the reaction solution comprises acetic acid.

2. The method according to claim 1, wherein the conductive polymer is an intrinsically conducting polymer that conducts electricity.

3. The method according to claim 2, wherein the conductive polymer is (poly (3, 4-ethylenedioxythiophene) polystyrene sulfonate) (PEDOT:PSS), poly [2, 6-(4, 4-bis-potassiumbutanylsulfonate-4H-cyclopenta-[2, 1-b; 3, 4-b']-dithiophene)-alt-4, 7-(2, 1, 3-benzothiadiazole)] (CPE-K) or poly [2, 6-(4, 4-bis-sodiumbutanylsulfonate-4H-cyclopenta-[2, 1-b; 3, 4-b']-dithiophene)-alt-4, 7-(benzene)] (CPEPh-Na).

4. The method according to claim 1, wherein the supporting substrate is a material capable of holding the conductive polymer film on a surface thereof.

5. The method according to claim 4, wherein the supporting substrate is glass, polyethylene terephthalate (PET), polyethylene naphthalate (PEN) or polyimide (PI).

6. The method according to claim 1, wherein the metallic nanowire layer is made of silver, gold, platinum, aluminum, or palladium.

7. The method according to claim 1, wherein the reaction solution comprises at least one metal salt, at least one reducing agent, and at least one solvent.

8. The method according to claim 7, wherein the at least one metal salt is silver nitrate, silver acetate, Tollens' reagent, silver fluoride, chloroplatinic acid, sodium tetrachloropalladate, potassium tetrachloropalladate, palladium chloride, or gold chloride hydrate.

9. The method according to claim 7, wherein the reducing agent is sodium citrate, citric acid, acetaldehyde, or glucose.

10. The method according to claim 7, wherein the solvent is water, ethanol, methanol, isopropanol, ethylene glycol, glycerin, or any mixture thereof.

11. The method according to claim 1, wherein the organic ligand residues are polyvinylpyrrolidone (PVP).

12. The method according to claim 1, wherein the metal nanoparticles comprise silver, gold, platinum, aluminum, palladium, or an alloy or mixture of any thereof.

13. The method according to claim 1, wherein the forming the conductive polymer film onto the supporting substrate comprises:
forming the conductive polymer into a solution; and
depositing the solution by spin coating, drop casting, spray coating, Mayer rod techniques, or doctor blade techniques.

14. The method according to claim 1, wherein the forming the metallic nanowire layer onto the conductive polymer film comprises:
forming metallic nanowires into a solution or dispersion; and
depositing the solution or dispersion by spin coating, drop casting, spray coating, a Mayer rod technique, or a doctor blade technique.

15. The method according to claim 1, wherein the period of time sufficient to remove the organic ligand residue is approximately 1-5 minutes so that the ligand is removed.

16. The method according to claim 1, wherein the step of drying the nanowire:conductive polymer composite comprises blowing-off or spinning to create a capillary force of the aqueous solvent at a metallic nanowire junction.

17. The method according to claim 1, wherein the treated nanowire: conductive polymer composite is substantially organic ligand residue-free and includes selective growth of metal nanoparticles at at least 75% of the junctions of the metallic nanowire layer.

18. The method according to claim 1, wherein the metallic nanowire layer comprises silver nanowires, and wherein the metal nanoparticles are silver nanoparticles.

19. The method according to claim 1, wherein the wetting the metallic nanowire:conductive polymer composite with a reaction solution comprises:
forming a reaction solution to a concentration of $10^{-3}$ M of silver salts and reducing agents; and
wetting the nanowire:conductive polymer composite with the reaction solution by drop casting, dipping, or immersing.

20. The method according to claim 19, wherein the reaction solution is an aqueous solution comprising silver nitrate, ascorbic acid, and acetic acid dissolved in water.

21. A method of integrating a ligand-free metallic nanowire network and conductive polymers, the method comprising:
forming a metallic nanowire layer by a process that leaves organic ligand residues on the metallic nanowire layer, the metallic nanowire layer including a plurality of junctions where two or more nanowires touch each other;
forming a conductive polymer film onto a supporting substrate;
integrating the metallic nanowire layer with the conductive polymer film to form a metallic nanowire:conductive polymer composite;
wetting the metallic nanowire:conductive polymer composite with a reaction solution including a source of metal ions and at least one acid for a period of time sufficient to remove the organic ligand residues from the metallic nanowire layer and sufficient to grow metal nanoparticles from the source of metal ions to create metal interconnections at the junctions where the two or more nanowires in the metallic nanowire layer touch each other;

removing the nanowire:conductive polymer composite from the reaction solution; and drying the nanowire:conductive polymer composite;

wherein the reaction solution comprises at least one metal salt, at least one reducing agent, at least one aqueous acid, and at least one solvent, and wherein the aqueous acid is acetic acid.

22. A method of integrating a ligand-free metallic nanowire network and conductive polymers, the method comprising:

forming a metallic nanowire layer by a process that leaves organic ligand residues on the metallic nanowire layer, the metallic nanowire layer including a plurality of junctions where two or more nanowires touch each other;

forming a conductive polymer film onto a supporting substrate;

integrating the metallic nanowire layer with the conductive polymer film to form a metallic nanowire:conductive polymer composite;

wetting the metallic nanowire:conductive polymer composite with a reaction solution including a source of metal ions and at least one acid for a period of time sufficient to remove the organic ligand residues from the metallic nanowire layer and sufficient to grow metal nanoparticles from the source of metal ions to create metal interconnections at the junctions where the two or more nanowires in the metallic nanowire layer touch each other;

removing the nanowire:conductive polymer composite from the reaction solution; and drying the nanowire:conductive polymer composite;

wherein the treated nanowire:conductive polymer composite is substantially organic ligand residue-free and includes selective growth of metal nanoparticles at at least 75% of the junctions of the metallic nanowire layer.

23. A method of integrating a ligand-free metallic nanowire network and conductive polymers, the method comprising:

forming a metallic nanowire layer by a process that leaves organic ligand residues on the metallic nanowire layer, the metallic nanowire layer including a plurality of junctions where two or more nanowires touch each other;

forming a conductive polymer film onto a supporting substrate;

integrating the metallic nanowire layer with the conductive polymer film to form a metallic nanowire:conductive polymer composite;

wetting the metallic nanowire:conductive polymer composite with a reaction solution including a source of metal ions and at least one acid for a period of time sufficient to remove the organic ligand residues from the metallic nanowire layer and sufficient to grow metal nanoparticles from the source of metal ions to create metal interconnections at the junctions where the two or more nanowires in the metallic nanowire layer touch each other;

removing the nanowire:conductive polymer composite from the reaction solution; and drying the nanowire:conductive polymer composite;

wherein wetting the metallic nanowire:conductive polymer with a solution comprises: forming a reaction solution to a concentration of $10^{-3}$ M; and wetting the nanowire:conductive polymer with the reaction solution by drop casting, dipping, or immersing, and wherein the reaction solution is an aqueous solution comprising silver nitrate, ascorbic acid, and acetic acid dissolved in water.

* * * * *